March 20, 1928.
J. LEDWINKA
1,663,520
PRESSED METAL VEHICLE DOOR
Filed Feb. 23, 1927   2 Sheets-Sheet 2
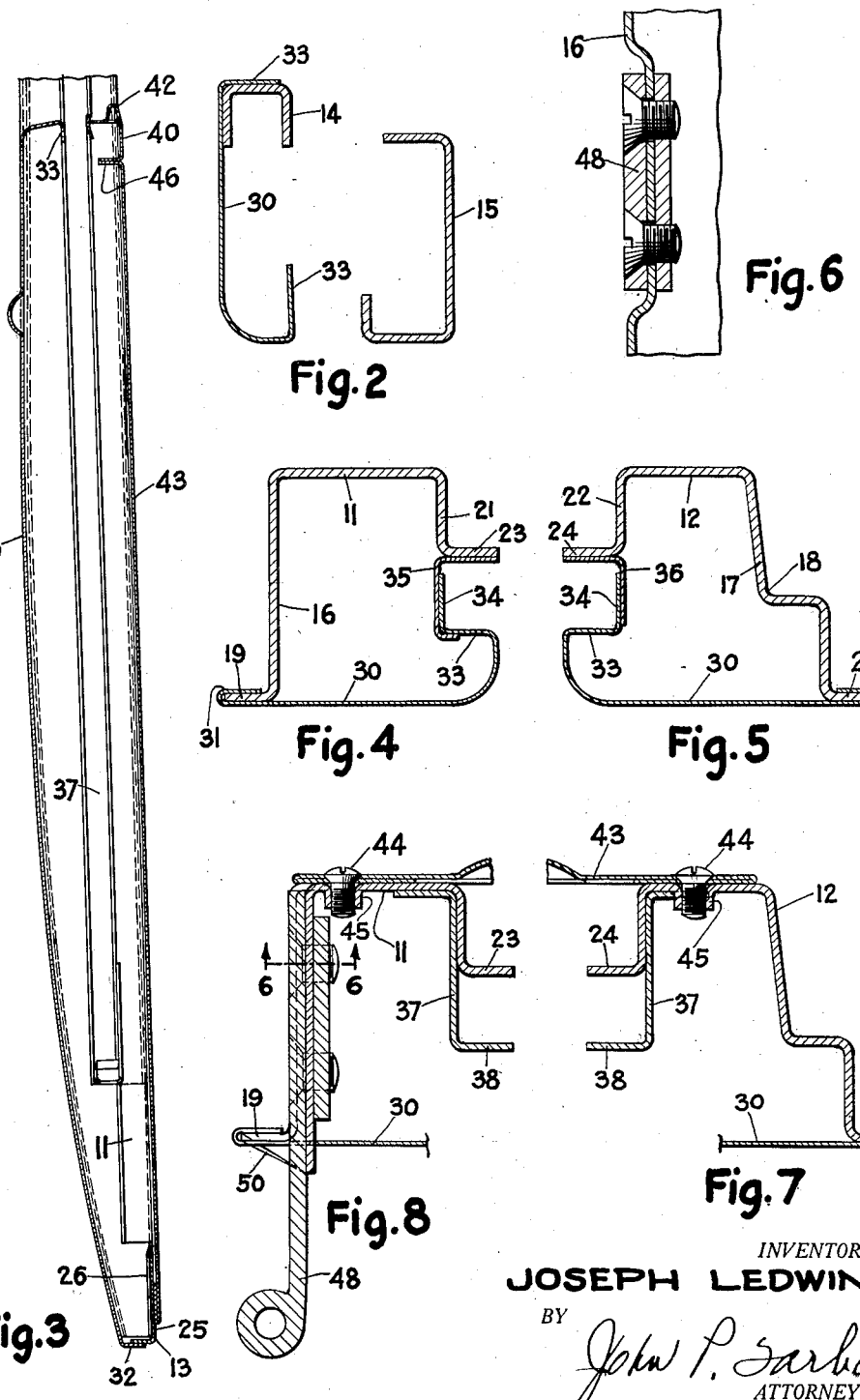
INVENTOR.
JOSEPH LEDWINKA
BY
*John P. Sarbox*
ATTORNEY.

Patented Mar. 20, 1928.

1,663,520

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

PRESSED-METAL VEHICLE DOOR.

Application filed February 23, 1927. Serial No. 170,146.

This invention relates to doors for vehicle bodies and more particularly to metallic doors for use in connection with enclosed cabs for automobile truck bodies and other closed body structures.

In those certain cases it has been found expedient and advisable to provide enclosed driving compartments for truck or delivery bodies, the doors for this purpose being provided at one or both sides of the driver's cab. Truck body doors, being usually subject to greater and more severe use than is ordinarily the case with the usual automobile body door, soon give way to the various strains and stresses to which they are subjected, with the result that they are prematurely rendered unfit to serve the purpose for which they are intended. Especially is this true where the door is of full length; that is, where the door extends the full length between the bottom or sill line of the cab to the top or roof line thereof.

Accordingly, it is among the principal objects of the present invention to design a door which is strong, durable and capable of withstanding the severe usage to which truck and other closed body doors are usually subjected.

A further object is to provide a door constructed of metal throughout, the sturctural frame elements constituting the same being such as permit the attainment of minimum weight together with maximum strength.

A still further object is to provide an all-metal door, the parts of which are simple to manufacture and require a minimum amount of time for assembly into the complete door, thus considerably reducing the manufacturing costs of the door.

A still further object is the provision of an inner panel which may be readily removed and replaced without interfering with the remainder of the door structure, this panel being further designed to render greater strength and rigidity to the door when in assembled position.

Other objects, and objects relating to details of economy and construction, will appear more fully hereinafter, and a structure constituting a preferred embodiment of the invention is illustrated in the accompanying drawings, forming a part of this invention, in which:

Figure 2 is a sectional view taken on the line 2—2 of Figure 1;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1;

Figure 6 is a sectional view taken on the line 6—6 of Figure 8;

Figure 7 is a sectional view taken on the line 7—7 of Figure 1; and

Figure 8 is a sectional view taken on the line 8—8 of Figure 1.

Figure 1:
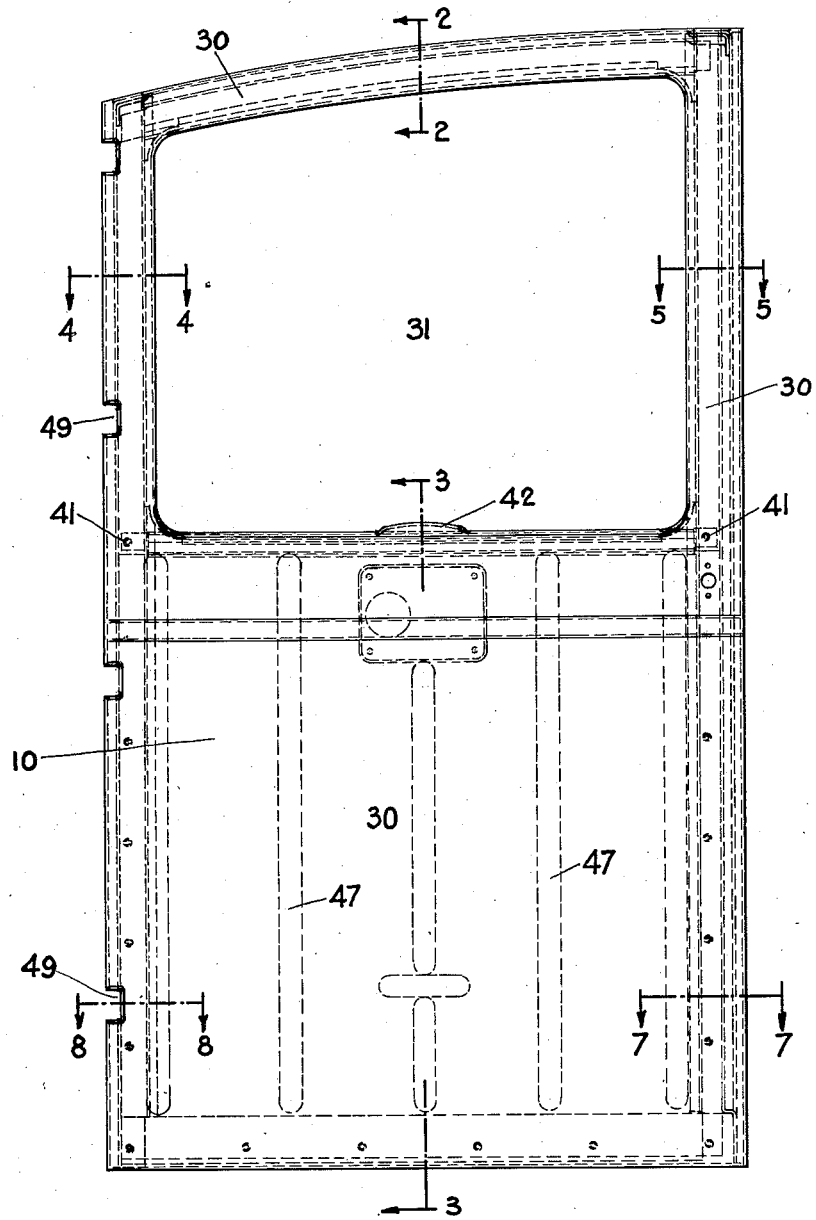
Figure 1 is a view in elevation of a door embodying the principles of the invention.

Referring more particularly to the drawings, the door, designated generally by the reference numeral 10 in Figure 1, comprises a pair of side rails 11 and 12 extending the full length of the door, the lower ends of these side rails being interconnected by the bottom rail 13 and the upper ends being interconnected by the transversely extending members 14 and 15, all in a manner to be described in greater detail hereinafter.

As is most clearly shown in Figures 4, 5, 7 and 8, the side rails 11 and 12 are in the form of stampings of substantially outwardly presenting channel formation, the former constituting the hinge rail and the latter constituting the jamb rail, respectively, of the door. The side wall 16 of the hinge rail is substantially flat throughout its entire length, while the side wall 17 of the jamb rail is rabbeted, as at 18, to accommodate the complementally formed shoulder on the door post (not shown) against which the jamb rail abuts. Both walls 16 and 17 of the hinge and jamb rails are provided at their free outer edges with oppositely extending flanges 19 and 20, respectively, these flanges lying in substantially the same vertical plane. The inner side walls 21 and 22 of the rails 11 and 12 terminate short of the central plane of the door, these walls being provided at their free edges with the laterally extending flanges 23 and 24, respectively.

Interconnecting the lower ends of the side rails 11 and 12 is the bottom rail 13, this rail being of substantially angle section, the opposite ends of the vertical branch 25 thereof overlapping the base walls of the side rails, this being most clearly shown in Figure 3. In order to obtain a substantially flush surface between the bottom rail 13 and the side rails 11 and 12, the base walls of the latter are offset inwardly, as at 26, an extent substantially equal in the thickness of the branch 25 of the bottom rail, the side walls 21 and 22 terminating just short of these offset portions. The upper ends of the side rails 11 and 12 are interconnected by the pair of stampings 14 and 15, the cross sections of which are most clearly shown in Figure 2. The member 14 is of substantially downwardly presenting channel cross section and is laterally spaced from and disposed at a somewhat higher elevation than the member 15, which is of substantially outwardly presenting channel cross section. The opposite ends of the depending side walls of the member 14 terminate short of the side walls 16 and 17 of the rails 11 and 12, the base of the channel, however, as shown in Fig. 1, continuing in the form of a downward extension at either end thereof for securement to the inner surfaces of the walls 16 and 17, respectively, of the side rails, this securement being preferably by welding or otherwise if desired. The opposite ends of the top and bottom walls of the member 15 terminate short of the side walls 21 and 22 of the rails 11 and 12, the base wall of the member 15 being provided with extensions at either end thereof which overlie and are secured, preferably by welding, to the inner surfaces of the base walls of the side rails in a manner similar to the connection of the bottom rail to the side rails. To facilitate the formation of these joints between the upper ends of the side rails and the member 15, the side walls 21 and 22 of the side rails may be cut away at their upper ends a depth sufficient to permit the passage therethrough of a welding electrode to bear against the inside of the bottom walls of the channels 11 and 12.

The foregoing describes the skeleton frame work of the door, and it will be seen that such frame work is exceedingly strong at the same time that it is light in weight, due to the particular cross sections of frame elements employed. Welding, which is the preferred method for joining the several frame elements together, further insures a strong and rigid construction.

The outer panel designated generally by the reference numeral 30 is in the form of a one piece stamping extending from the bottom line of the door to the top thereof, the upper portion being provided with an opening with an opening 31 constituting the window opening of the door. This panel 30 is vertically and longitudinally contoured to correspond to the curvature of the side rails 11 and 12 and the vertically extending side edges thereof are clinched, as at 31 over the outwardly extending flanges 19 and 20 of the vertically extending side rails 11 and 12. The bottom edge of the panel is turned inwardly as at 32, and is welded or otherwise secured to the horizontally extending branch of the bottom rail 13. In similar manner, the upper edge of the outer panel 30 is also provided with an inwardly extending flange 33' overlying and secured, preferably by welding, to the base wall of the upper channel member 14. The portions of the outer panel which define the window opening 31 are turned inwardly and away from said window opening, as is indicated most clearly by the reference numeral 33 in Figures 2, 3, 4 and 5, the portions defining the sides of the window opening being further provided with the inwardly extending flanges 34.

In the upper sections of the side rails 11 and 12, that is, in the portions of the side rails opposite the window opening, angle members 35 and 36 are provided for interconnecting the vertically extending flanges 34 of the outer panel with the flanges 23 and 24 of the side rails. There are thus formed vertically extending glass run channels for receiving the side edges of the window glass, the base walls of which are formed by the flanges 34 of the outer panel and the side walls of which are formed by the flanges 23 and 24 of the side rails and the inturned portions 33 of the outer panel, this appearing most clearly in Figures 4 and 5. These glass run channels continue downwardly into the body of the door, the lower sections thereof being formed by the provision of a pair of vertically extending members 37 of substantially Z cross section, the web and the inner branch of each member being nested in the angles formed by the inner side and base walls of the side rails 11 and 12. As most clearly appears in Figures 7 and 8, the webs of these Z members project beyond the flanges 23 and 24 of the side rails, the outer branches 38 thereof forming with these flanges 23 and 24 the side walls of the lower portions of the glass run channels, the branches 38 being in substantially vertical alignment with the inturned portions 33 of the outer panel 30.

Extending transversely across the door, immediately below the bottom edge of the window opening, and serving to interconnect the side rails of the door, is the substantially outwardly presenting channel member 40, the side ends of which are secured to the base walls of the side rails, preferably by means of screws, as at 41. This member 40 is provided at a point intermediate its length with an integrally formed upstanding portion 42 constituting the inner hand-hold for the door.

The inner sheet metal panel 43 of the door is doubled over along its side and bottom edges and is detachably secured to the door rails by means of screws 44 threaded into the interiorly threaded bosses 45 provided in the side rails 11 and 12 and bottom rail 13. The upper edge of the inner panel 43 is provided with a flange 46 underlying and closely fitting against the bottom flange of the transversely extending member 40. To insure greater rigidity and strength, the inner panel is provided with a series of vertically extending strengthening ribs 47. The provision of a double thickness of metal at the side and bottom of the inner panel not only adds to the rigidity and strength thereof, but it also permits the formation of countersunk apertures for receiving the heads of the securing screws 44, thus insuring a neat finish and appearance of the inside of the door.

While the wall 16 of the hinge rail 11 has been described as being substantially flat throughout its entire extent, it is provided with depressions (see Figures 6 and 8) for receiving the hinge elements 48, four of which are provided in this particular door. These hinge elements lie against and are secured to the outer surface of the wall 16, the flange 19 thereof and the panel 30 being cut away, as at 49, to accommodate these hinges. In order to lend a finished appearance to the exterior surface of the door at the points of attachment of the hinges thereto, the panel 30 is struck up as at 50 to cover the gap between the hinge and the overlap of the door. This not only adds to the appearance of the door but makes unnecessary the provision of puddle welding at these points.

It is, of course, understood that various changes and modifications may be made in the door construction shown and described herein without departing from the spirit or principles of the invention, and accordingly it is desired to claim the same broadly, as well as specifically, as indicated in the appended claims.

What is claimed as new and useful is:

1. In a pressed metal door structure, a pair of vertically extending side rails of substantially outwardly presenting channel formation, the inner walls of said rails being provided with laterally extending flanges lying substantially in the same vertical plane, a pair of members secured to the inner walls of said channels and provided with flanges spaced from but paralleling said first mentioned flanges, said parallelly arranged flanges constituting the side walls of a pair of glass run channels in the lower region of the door below a window opening therein.

2. In a pressed metal door structure, a side rail of substantially outwardly presenting channel formation, the walls of said channel being provided with oppositely projecting flanges, one of said walls being of substantially less depth than the other, and a vertically extending member having one branch thereof secured to the inner surface of said wall of less depth and terminating in a flange spaced from but substantially paralleling the laterally extending flange of the wall to which said member is secured to form therewith a glass run channel in the lower region of the door below a window opening therein.

3. In a pressed metal door structure, a pair of outwardly presenting channel shaped side rails, the inner walls of said channels terminating in flanges lying in substantially the same vertical plane, a sheet metal panel secured to said side rails and lying in a plane substantially parallel to but spaced from said first mentioned plane, the upper portion of said panel being provided with an opening, the side edges of which are defined by integrally formed reversely bent portions of said panel, said reversely bent portions lying in a plane intermediate the planes of said flanges and said panel, said flanges and reversely bent portions of said panel constituting the side walls of glass run channels and means interconnecting the said flanges and the adjacent reversely bent portions of the panels.

4. In a pressed metal door structure, a pair of vertically extending side rails, an inner sheet metal panel arranged to be detachably secured thereto, the edges of said panel being doubled over to strengthen it and give body thereto, and having said turned over edge portions provided with countersunk apertures, and headed securing means passing through said countersunk apertures and for retention by said side rails and having their heads seated in the countersinks.

5. In a pressed metal door structure, a pair of outwardly presenting channel section side rails, a panel having its side edges secured to the free edges of the outer walls of said rails, the upper portion of said panel being provided with a window opening the side edges of which are defined by the free edges of the inner walls of said rail and inturned portions of said panel secured to said inner walls, said inturned portions of the panel providing a side and the bottom of the upper sections of the glass run channel.

6. In a door for closed vehicle structures, a side rail of outwardly presenting channel form having its inner side wall formed with a lateral flange, a panel stamping having one side edge secured to the free edge of the outer side wall of the rail and being inturned at the side of the window opening and formed with an angular edge portion having its arms arranged, respectively, at the outer side and at the base of a glass run channel, the lateral flange on the inner side wall of the channel rail being arranged at the other side of the glass run channel, and means interconnecting the arm of the panel at the base of the channel with the inner side wall of the channel form rail.

7. In a door for closed vehicle structures, an outwardly presenting channel form side rail, a panel stamping having one side edge secured to the free edge of the outer side wall of the rail and being inturned at the window opening and formed with an angular edge portion having its arms forming a side and the base of a glass run channel, and an angular strip secured to the channel base arm of the panel and to the inner side wall of the rail and having one arm thereof form the other side of said glass run channel.

In testimony whereof he hereunto affixes his signature.

JOSEPH LEDWINKA.